(12) United States Patent
Thompson et al.

(10) Patent No.: US 7,319,378 B1
(45) Date of Patent: Jan. 15, 2008

(54) ANTI-THEFT SYSTEM FOR A VEHICLE WITH REAL-TIME NOTIFICATION FEATURE

(76) Inventors: Bobbie Thompson, 1919 Madison Ave., Suite 805, New York City, NY (US) 10035; Markeith Boyd, 5404 Matthews Rd., Middleton, WI (US) 53562; Shirley Lorraine Boyd, 5404 Matthews Rd., Middleton, WI (US) 53562

( * ) Notice: Subject to any disclaimer, the term of this patent is extended or adjusted under 35 U.S.C. 154(b) by 197 days.

(21) Appl. No.: 11/104,018

(22) Filed: Apr. 12, 2005

Related U.S. Application Data

(60) Provisional application No. 60/561,265, filed on Apr. 12, 2004.

(51) Int. Cl.
*B60R 25/10* (2006.01)
(52) U.S. Cl. .............. 340/426.1; 340/540; 340/541; 340/937; 438/148; 438/152; 438/143
(58) Field of Classification Search ........... 340/426.1, 340/540, 541, 937; 348/148, 152, 143
See application file for complete search history.

(56) References Cited

U.S. PATENT DOCUMENTS

| 4,908,629 | A | | 3/1990 | Apsell et al. |
|---|---|---|---|---|
| 5,027,104 | A | * | 6/1991 | Reid ........................ 340/541 |
| 5,793,283 | A | | 8/1998 | Davis |
| 5,917,423 | A | | 6/1999 | Duvall |
| 6,002,326 | A | * | 12/1999 | Turner .................... 340/426.1 |
| 6,151,065 | A | | 11/2000 | Steed et al. |
| 6,675,006 | B1 | * | 1/2004 | Diaz et al. .............. 455/404.1 |
| 6,693,535 | B2 | * | 2/2004 | Van Bosch et al. ...... 340/539.1 |
| 2004/0000989 | A1 | | 1/2004 | Davis |

* cited by examiner

*Primary Examiner*—Tai Nguyen
(74) *Attorney, Agent, or Firm*—Mark Levy & Associates, PLLC

(57) ABSTRACT

A comprehensive vehicle anti-theft and alarm system that immediately notifies a vehicle owner when a vehicle is being tampered with. Notification is accomplished via wireless signal to the owners' cell phone, personal digital assistant (PDA), laptop or desktop computer, or other electronic device, or to the police. The signal can be used to provide an audible, inaudible (e.g., vibratory), or visual alert, depending upon the mode the owner has chosen. In addition, the system transmits a photograph or image of the person tampering with the vehicle. The transmitted image(s) may be periodically refreshed. In alternate embodiments of the system, realtime streaming video may be transmitted. The anti-theft system typically includes a GPS receiver that tracks the movements of the vehicle in the event it is actually stolen. Finally, the system includes a communications link that allows the owner to speak directly to the unauthorized occupant of the vehicle.

16 Claims, 2 Drawing Sheets

ANTI-THEFT SYSTEM FOR A VEHICLE WITH REAL-TIME NOTIFICATION FEATURE

RELATED APPLICATIONS

This application claims priority from U.S. Provisional Patent Application Ser. No. 60/561,265 filed Apr. 12, 2004 in accordance with 35 U.S.C. §119(e) and is a Continuation-in-Part application thereof.

FIELD OF THE INVENTION

The present invention pertains to anti-theft and alarm systems for vehicles and, more particularly, to alarm system providing real-time notification to persons remote therefrom.

BACKGROUND OF THE INVENTION

Vehicle theft presents an ongoing problem to society in that loses to insurance companies are reflected in the insurance premiums of all vehicle owners. Stolen vehicles are often involved in accidents resulting in further harm to people, other vehicles and other property. While the prior art is replete with vehicle anti-theft devices and alarm systems, the problem of vehicle theft remains seemingly unabated. No anti-theft device or system has heretofore provided the necessary features to either prevent vehicle theft from occurring in the first place or, more importantly, to provide a mechanism for aborting a theft once the vehicle has actually been stolen.

Many attempts have been made to provide effective vehicle anti-theft systems. For example, U.S. Pat. No. 5,917,423 for VEHICLE TRACKING TRANSPONDER AND TRANSPONDER METHOD, issued Jun. 29, 1999 to William R. Duvall provides a system wherein an on-vehicle transponder allows tracking of a stolen vehicle. The DUVALL system also includes a vehicle operator-activated "panic" alarm to transmit a distress signal. In addition, detection circuits to sense hot wiring attempts, unauthorized starting, and other abnormal vehicle conditions are provided.

U.S. Pat. No. 4,908,629 for APPARATUS FOR LOCATING AND/OR TRACKING STOLEN OR MISSING VEHICLES AND THE LIKE, issued Mar. 13, 1990 to Sheldon P. Apsell et al. provides a vehicle tracking and location system. This APSELL et al. patent is assigned on its face to the well known stolen/missing vehicle tracking company, LoJack, Incorporated.

U.S. Pat. No. 5,793,283 for PAGER VEHICLE THEFT PREVENTION AND RECOVERY SYSTEM, issued Aug. 11, 1998 to Ronnie Davis discloses a system having a built-in transceiver which, in cooperation with an on-vehicle GPS receiver, transmits the vehicle's current coordinates to a pager.

U.S. Pat. No. 6,151,065 for CONCEALED INTEGRATED VEHICULAR CAMERA SYSTEM, issued Nov. 21, 2000 to Van P. Steed et al. provides a concealed camera useful for capturing images of one or more vehicle occupants.

None of these patents, individually or in any combination, teaches or suggests the novel anti-theft system of the present invention.

SUMMARY OF THE INVENTION

In accordance with the present invention there is provided a comprehensive vehicle anti-theft and alarm system. In the embodiment chosen for purposes of disclosure, a Personal Car Cam Alarm (PCCA) is described. The PCCA is a complete vehicle protection system that combines leading edge technology to provide a comprehensive vehicle protection system. The PCCA immediately notifies a vehicle owner or his or her agent when a vehicle equipped with the inventive system is being tampered with. Notification is accomplished via a wireless signal to the vehicle owner's cell phone, personal digital assistant (PDA), laptop or desktop computer, or other electronic device. The signal can be used to provide an audible, inaudible (e.g., vibratory), or visual alert, depending upon the mode the owner has chosen. In addition, the PCCA transmits a photograph of the person tampering with the vehicle to the owner's cell phone, PDA, laptop, etc., thereby permitting the owner to view in real time the person or persons tampering with the vehicle. The transmitted photos may be periodically refreshed.

In alternate embodiments of the inventive PCCA system, realtime streaming video may be transmitted. The PCCA typically includes a GPS receiver that tracks the movements of the vehicle in the event it is actually stolen. Finally, the PCCA of the present invention includes a two-way communications link that allows the owner to speak directly to the unauthorized occupant of the vehicle, typically informing the occupant that he or she is being monitored, tracked and viewed. It is anticipated that this communication may convince the occupant to abort the theft.

It is, therefore, an object of the invention to provide a vehicle anti-theft system that communicates vehicle theft attempts in real time to a vehicle owner.

It is another object of the invention to provide a vehicle anti-theft system that communicates a video image of a vehicle occupant.

It is a further object of the invention to provide a vehicle anti-theft system that communicates a series of still images of a vehicle occupant.

It is an additional object of the invention to provide a vehicle anti-theft system that communicates a streaming video image of a vehicle occupant.

It is yet another object of the invention to provide a vehicle anti-theft system that provides a two-way voice communication system with a vehicle's occupant.

It is a still further object of the invention to provide a vehicle anti-theft system that includes a remotely actuated engine disabling feature.

It is an additional object of the invention to provide a vehicle anti-theft system that may be remotely activated.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION OF THE PREFERRED EMBODIMENT

Generally speaking, the Personal Car Cam Alarm (PCCA) is a vehicle alarm system and anti-theft system that greatly improves upon existing vehicle alarms and/or anti-theft systems of the prior art. The system may be manufactured by automobile manufacturers or may be installed in existing vehicles. PCCA is a comprehensive vehicle protection system that immediately notifies the vehicle owner or other designated party or agency that a PCCA-equipped vehicle is being tampered with or is experiencing some other form of unauthorized activity.

Figure 1:
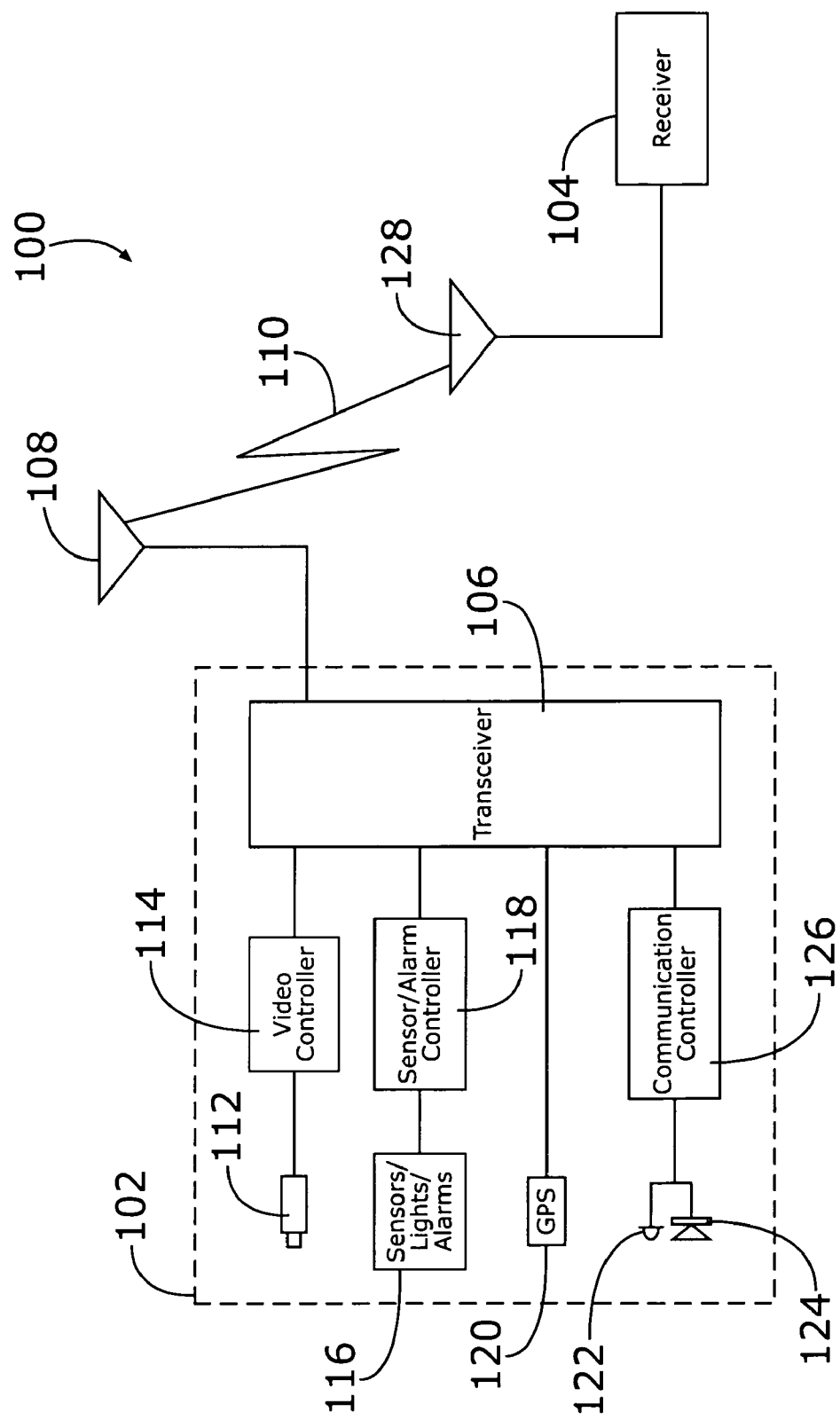
FIG. 1 is functional block diagram of the vehicle anti-theft system of the invention.

Referring first to FIG. 1, there is shown a system block diagram of the novel PCCA system, generally at reference number 100. The inventive system consists of an on-board vehicle sub-system (OBVS) 102 and a receiver 104. OBVS 102 has a transceiver 106 connected to an antenna 108. Transceiver 106 is adapted to both transmit and receive radio frequency (RF) signals shown schematically as communications link 110. Both transceivers and vehicle-mounted antennas are well known to those of skill in the mobile communications arts and are not further described herein.

In one embodiment of the PCCA 100 of the invention, communications link 110 represents a cellular communications network and both transceiver 106 and receiver 104 are communications devices compatible therewith. The use of the cellular communications network to implement communications link 110 for data communications such as the two-way communications required by PCCA 100 is known to those of skill in the art. Also known to those skilled in cellular communications arts are the use of devices such as cell phones and PDAs, neither of which is shown, connected to the cellular network communications link 110 for two-way voice communication (a normal cellular telephone function). Moreover, the transmission of still images and streaming video (both standard video cellular phone functions) is also well known. Likewise, the use of a cellular network to transmit data is also well known to those of skill in the cellular communications arts.

Figure 2:
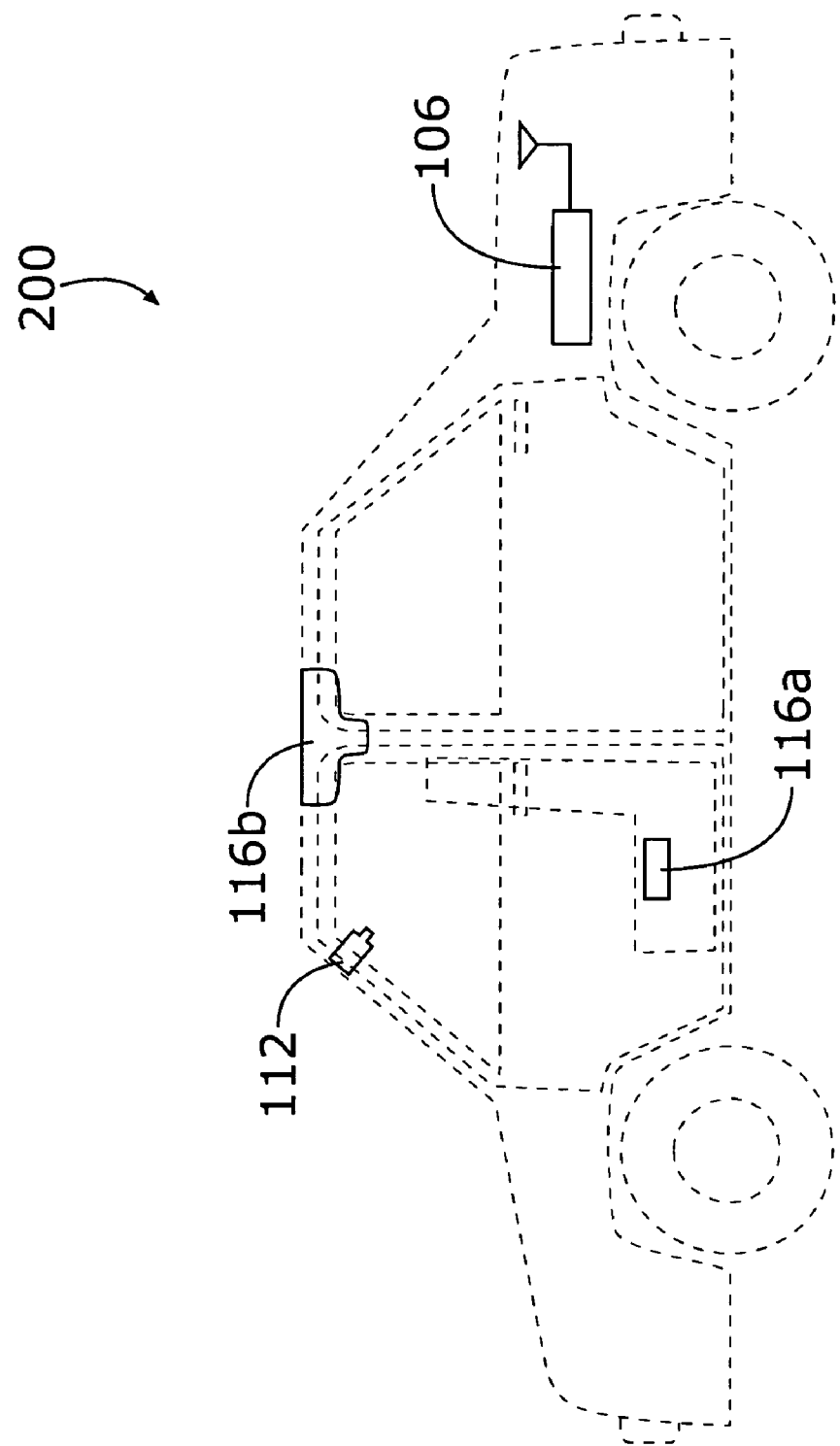
FIG. 2 is a side elevational, schematic view of a vehicle having the anti-theft system of FIG. 1 installed therein.

One or more cameras 112 are mounted in or on a vehicle 200 (FIG. 2). Such cameras 112 and techniques for mounting such cameras 112, either overtly or covertly, within a vehicle 200 are also known. One such method of hiding a camera 112 within a vehicle 200 is disclosed in U.S. Pat. No. 6,151,065 to STEED which is included herein by reference. However, it will be recognized that many other methods and/or locations exist to mount a camera 112 within a vehicle 200 and the present invention is not limited to any particular method, camera location, or number of cameras 112. Rather, the invention covers any and all possible ways of mounting and/or hiding a camera 112 within a vehicle 200. Moreover, cellular telephones have been produced recently that include digital photograph-taking features. For example, U.S. published patent application no. US 2004/0000989 A1, published Jan. 1, 2004 for VEHICLE MONITORING SYSTEM THAT USES A CELLULAR TELEPHONE TO NOTIFY OF VEHICLE TAMPERING, applied for by Glen A. Davis, discloses a system based on a cellular telephone network. Accordingly, camera 112 is intended to include any imaging device such as, but not including, digital cameras, sensors, and cellular telephones. Since some of the functionality of a cellular telephone, not shown, is indicated in FIG. 1 as video controller 114 and transceiver 106, it will be recognized that FIG. 1 can be suitable modified to reflect that fact that these functions are handled by cellular telephones.

Camera 112 is connected to a video controller which is, in turn, connected to transceiver 106. Video controller 114 provides any and all necessary support functions to prepare a video signal from camera 112 for transmission to a remote receiver 104. Suitable video controllers 114 are known to those of skill in the art and are not further described herein.

Sensors/lights/alarms block 116 represents the input/output (I/O) portion of the inventive PCCA 100 and includes any sensors, lights, alarms, or any other device or apparatus within vehicle 200, collectively identified as reference number 116, that provide input to or are manipulated by the PCCA 100.

Many possible occupancy sensors, none of which are specifically identified in FIG. 1, may be used. For example, an infrared light emitter and transmitter unit may be embedded in a door panel, dashboard, etc., so as to direct an infrared light beam across the driver's seat or other appropriate area.

Other sensors may be functionally connected to the vehicle's brake and/or accelerator pedals so that the alarm is triggered thereby. Alternately, one or more infrared beams may also be used in the foot well so that when the beam is interrupted the alarm system may be activated.

Pressure sensors may be embedded in the driver's seat cushion so that pressure thereupon activates the alarm. A typical seat-mounted pressure sensor 116a may is illustrated in FIG. 2.

Motion sensors may be embedded in a door panel, dashboard, or other location within the vehicle that can activate the alarm when vehicle occupancy is sensed.

It will be recognized that any combination of sensors 116 may be utilized to activate the PCCA anti-theft system 100 and that the inventive PCCA system 100 is highly customizable.

Specifically included in block 116 are one or more interior cabin lights, represented by dome light 116b (FIG. 2) in vehicle 200. These are typically utilized to provide enough ambient light to ensure that useful images, not, shown, are captured by camera 112 even during non-daylight hours or when a vehicle is within a relatively dark interior space, for example, a parking garage. It will be recognized that a wide range of lamps, alarms, and sensors may be used to adapt the PCCA 100 to meet a particular operating circumstance or environment. The invention is therefore not limited to any particular sensors, lights, and/or alarms but covers any combination of such devices. All such sensors/lights/alarms 116 are electrically or wirelessly connected to a controller 118 and, subsequently to transceiver 106.

A global positioning system (GPS) receiver 120 is connected to transceiver 106. GPS receiver 120 is adapted to monitor the location of vehicle 200 and report that position to receiver 104.

A two-way voice communications system consisting of a microphone 122, a speaker 124, and a communications controller 126 is also provided. Communications controller 126 is connected to transceiver 106. While separate microphone 122 and speaker 124 components are shown, it will be recognized that the functions thereof may readily be combined into a single transducer, not shown. Also, the functions provided by microphones 122 and speaker 124 may be provided by devices forming a part of an existing audio component, not shown, within vehicle 200. The present invention covers any and all such implementation of voice transducers as well as a discrete microphone 122 and speaker 124 shown for purposes of disclosure.

Power for PCCA 100 is typically supplied by the vehicle battery, not shown. In addition, back-up batteries, not shown, may also be included to ensure proper functioning of PCCA 100 in the event, for example, that the car's battery was stolen, disconnected, or otherwise becomes non-functional.

Many optional, operational features may be included in PCCA 100. For example, an automatic door lock system may be provided wherein the vehicle's doors automatically lock after a predetermined time interval after a triggering event. A typical triggering event is the closing of the last open vehicle door. The automatic door lock feature may be combined with an automatic secure function wherein the vehicle's windows are automatically closed after a predetermined time interval after a triggering event.

An audible alarm that, for example, issues warning chirps when a violation is detected may optionally be included in PCCA 100.

The vehicle's dome light, other similar interior lights, or external light(s) may be activated when a violation is detected.

An auto-arming feature may be included in PCCA 100 wherein the alarm/anti-theft system is automatically armed a predetermined time interval after a triggering event, for example, after the last vehicle door is closed.

PCCA 100 may have a programmable perimeter control feature whereby a variable sized perimeter may optionally be established around vehicle 200.

A valet parking feature may be included in PCCA 100 to selectively activate certain alarm zones, typically the hood, trunk and glove box, while deactivating other alarm zones or regions.

A remote engine shut-down feature may also be included whereby the vehicle's engine, not shown, may be shut down by a remote signal.

Other functions such as remote door unlocking, and vehicle finder (i.e., flash lights, beep horn, etc. to find the vehicle in a parking lot, etc.) may also be included in PCCA 100.

A receiver 104 is shown remotely located from vehicle 200. An antenna 128 connected to receiver 104 is adapted to receive an RF signal via communications link 110. Receiver 104 is intended to represent a wide variety of devices that include cell phones, pagers, personal digital assistants (PDAs), laptop or desktop computers, or any other electronic device, none of which are individually shown. The invention is not considered limited to the aforementioned electronic devices but rather includes any and all existing device capable of receiving a notification transmitted by transceiver 106. Receiver 104 includes an annunciation device, not shown, to alert the vehicle owner or other authorized person of an alert received from transceiver 106.

Receiver 104 may also include appropriate means for receiving and displaying either still images or streaming video from transceiver 100. The received image(s) may optionally be recorded at receiver 104 onto a disk drive, not shown, or other storage medium. For purposes of further discussion, receiver 104 is assumed to be a cell phone or PDA having both video display and voice communication capability.

Further, receiver 104 may also include voice communications capability compatible with the two-way communications sub-system 122, 124, 126 present within the vehicle portion 102 of PCCA 100.

In operation, PCCA 100 is first activated. Many schemes for activation are possible, including auto-activation of the system a predetermined delay time after the last door of the vehicle is closed or some other similar event occurs. PCCA 100 may also be remotely activated by the owner who enters a PIN number or other code into the cell phone or, in alternate embodiments, simply pushing a button on receiver 104. The remote activation feature is useful in the event of a carjacking or other event the owner wants recorded. The owner may merely want to receive video images from the vehicle 200, for example.

Once PCCA 100 is activated, any triggering event sensed by one of the sensors/sensing systems 116 creates an alarm condition that is immediately transmitted to receiver 104 via communications link 110 where an appropriate indication, audible or visual, may be generated. The owner may then respond appropriately by enlisting the aid of the police, etc.

Depending on how a particular PCCA 100 is programmed, a number of different events may then occur. First, PCCA 100 may begin transmitting images from camera 112 within vehicle 200. The vehicle's roof and/or interior lights 116b (FIG. 2) are automatically turned on briefly so that the pictures from camera 112 are as clear as possible so as to accurately depict the occupant. Clear pictures may enable the owner or a law enforcement agency to identify the unauthorized occupant even during evening hours, or when the car is in a darkened area. Still images may be periodically transmitted, for example, at seven second or other intervals. In alternate embodiments, PCCA 100 may transmit streaming video, typically in 15 second segments. Because of the interactive nature of the PCCA system 100, the owner may switch video modes from still images to streaming video, at his or her discretion. Images, of course, may be captured, stored, and printed. Receiver 104 may have a facility for forwarding (i.e., uploading) video image files to a police or other law enforcement agency via e-mail or by another on-line communications strategy. Concurrently, the vehicle owner may receive periodic GPS locations of the vehicle.

Also, at the instigation of the vehicle owner, two-way voice communication may be established with the vehicle. This allows the owner to speak directly to the unauthorized occupant of the vehicle, informing him or her that they are being monitored, tracked and viewed. This information may convince he occupant to abort the theft.

The PCCA 100 operations combine to provide a highly effective vehicle theft protection system. In the event that vehicle theft actually occurs, recovery of the vehicle 200 is highly probable. Transmitting images of the vehicle occupant assist in identifying the perpetrator(s).

Since other modifications are changes varied to fit particular operating conditions and environments or designs will be apparent to those skilled in the art, the invention is not considered limited to the examples chosen for purposes of disclosure, and covers changes and modifications which do not constitute departures from the true scope of this invention.

Having thus described the invention, what is desired to be protected by letters patents is presented in the subsequently appended claims.

What is claimed is:

1. A vehicle anti-theft system, comprising:
   a) at least one sensor disposed in a vehicle adapted to detect an unauthorized condition in or about said vehicle and for generating an alarm signal in response thereto;
   b) a transceiver operatively connected to said sensor adapted for transmitting said alarm signal;
   c) an imaging device disposed in said vehicle and operatively connected to said transceiver, for imaging at least a portion of an occupant of said vehicle upon selective activation by at least said alarm signal;
   d) a two-way voice communication system disposed within said vehicle and operably connected to said transceiver; and
   e) a receiver adapted for reception of said signal from said transceiver and disposed remotely therefrom, said receiver being adapted to display at least one of a still image and a streaming video of said imaging device, wherein said receiver is adapted to activate said two-way voice communication.

2. The vehicle anti-theft system as recited in claim 1, further comprising:
   f) means for activating at least one light inside said vehicle in response to said alarm signal.

3. The vehicle anti-theft system as recited in claim 1, wherein said still image comprises a series of still images.

4. The vehicle anti-theft system as recited in claim 1, wherein communication between said transceiver and said receiver is accomplished by a communications link.

5. The vehicle anti-theft system as recited in claim 4, wherein said communications link comprises a cellular network.

6. The vehicle anti-theft system as recited in claim 1, further comprising:
   f) a local alarm disposed proximate said vehicle and responsive to said alarm signal.

7. The vehicle anti-theft system as recited in claim 6, wherein said local alarm comprises at least one of: an audible alarm, and a visual alarm.

8. The vehicle anti-theft system as recited in claim 1, wherein said at least one sensor comprises at least one of the sensor types: an IR beam, a pressure sensor, and a motion detector.

9. The vehicle anti-theft system as recited in claim 1, further comprising:
   f) means for disabling an engine of said vehicle.

10. The vehicle anti-theft system as recited in claim 9, wherein said means for disabling the engine of said vehicle is activated remotely from said vehicle.

11. The vehicle anti-theft system as recited in claim 1, wherein said receiver is adapted to transmit a GPS signal representative of a position of said vehicle to said receiver.

12. A vehicle anti-theft system, comprising:
   a) at least one sensor disposed in a vehicle adapted to detect an unauthorized condition in or about said vehicle and for generating an alarm signal in response thereto;
   b) a transceiver operatively connected to said sensor adapted for transmitting said alarm signal and receiving a remote activation signal;
   c) an imaging device disposed in said vehicle and operatively connected to said transceiver, for imaging at least a portion of an occupant of said vehicle upon activation by at least said remote activation signal;
   d) a two-way voice communication system disposed within said vehicle and operably connected to said transceiver; and
   e) a receiver adapted for reception of said alarm signal from said transceiver and disposed remotely therefrom, said receiver being adapted to display at least one of a still image and a streaming video of said imaging device, wherein said receiver is adapted to activate said imaging device.

13. The vehicle anti-theft system as recited in claim 12, further comprising:
   f) means for activating at least one light inside said vehicle in response to said alarm signal.

14. The vehicle anti-theft system as recited in claim 12, wherein communication between said transceiver and said receiver is accomplished by a communications link.

15. The vehicle anti-theft system as recited in claim 14, wherein said communications link comprises a cellular network.

16. The vehicle anti-theft system as recited in claim 12, further comprising:
   f) a local alarm disposed proximate said vehicle and responsive to said alarm signal.

* * * * *